Oct. 30, 1945.   A. C. SCINTA   2,388,089
WINDSHIELD CLEANER
Filed July 19, 1944
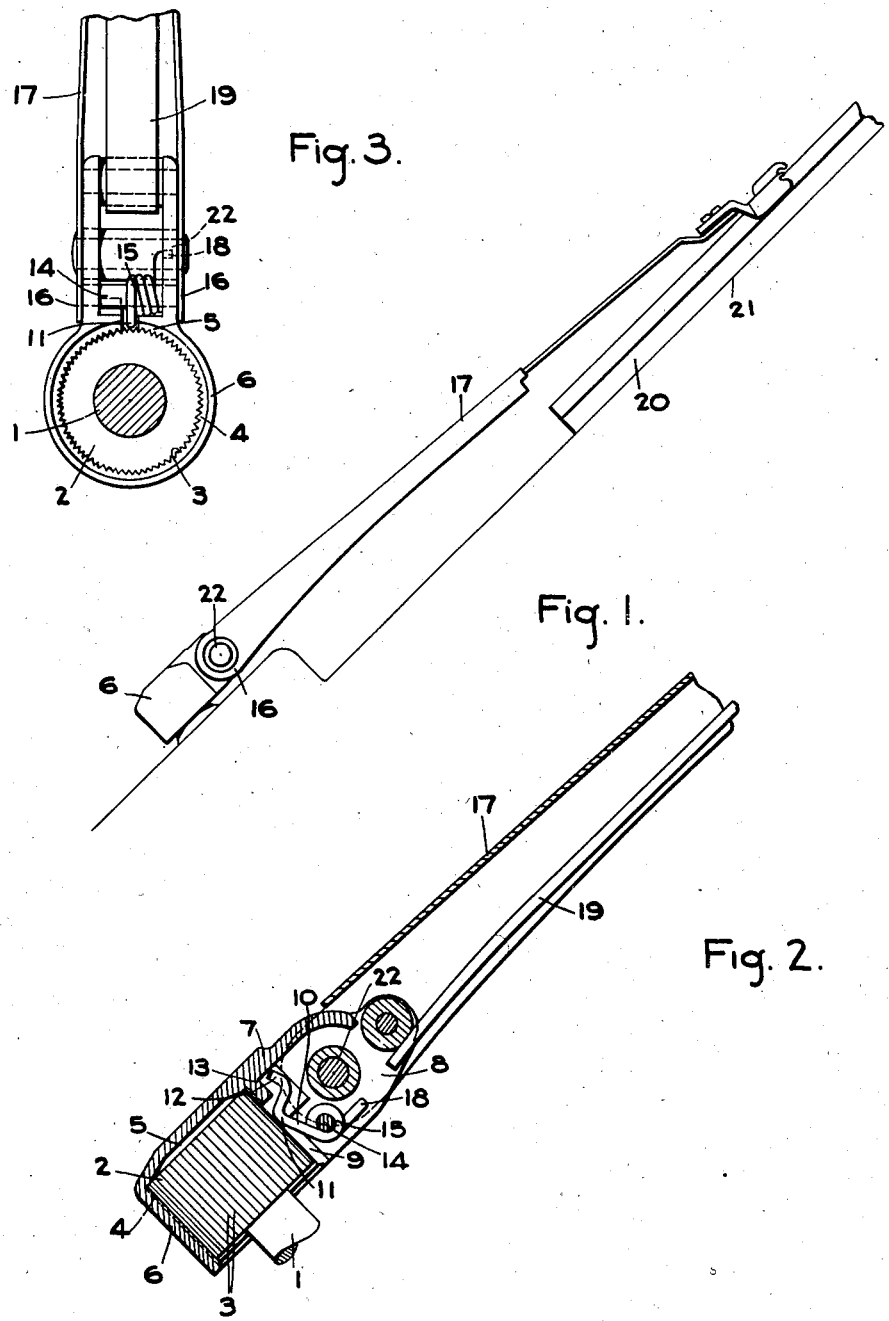
INVENTOR
ANTHONY C. SCINTA
BY
Beau, Brooks, Buckley & Beau  ATTORNEYS Patented Oct. 30, 1945

2,388,089

UNITED STATES PATENT OFFICE 2,388,089

WINDSHIELD CLEANER

Anthony C. Scinta, Buffalo, N. Y., assignor to Trico Products Corporation, Buffalo, N. Y.

Application July 19, 1944, Serial No. 545,623

7 Claims. (Cl. 287—53)

This invention relates to windshield cleaners and particularly to the wiper carrying arm thereof.

Many of the windshield cleaners now in use have wiper operating shafts with enlarged cylindrical heads. The periphery of such a shaft head is fluted or formed with longitudinal ribs to interlockingly and adjustably fit within a socket in the wiper arm. This not only provides an efficient arm mounting, but enables the path of wiper oscillation to be shifted to suit the particular windshield. Such an arrangement and construction is shown in U. S. Letters Patent No. 2,286,035 wherein it will be observed that latch means are employed for engaging a shoulder to detachably secure the arm against accidental displacement from the fluted head. However, should the arm be pushed onto the head short of its exact position the latch will fail to engage the shoulder and therefore the arm may work itself loose and become accidentally displaced.

The primary object of the present invention is to provide a wiper arm which will secure its mounting in a practical manner, and further to provide one which will lock itself to the shaft regardless of its position thereon, so that should the mechanic in his haste push the socketed arm over the head short of its innermost position, it will, nevertheless, be held against accidental dislodgement during subsequent travel of the vehicle.

In the drawing:

Fig. 1 is a side elevation of the improved wiper arm showing its practical application;

Fig. 2 is a fragmentary longitudinal section through the arm illustrating the same positioned on the head of the wiper shaft; and Fig. 3 is a fragmentary rear elevation of the arm applied to the shaft head, the shaft being in cross section.

Referring more particularly to the drawing, the numeral 1 designates the oscillatory shaft of a windshield cleaner motor having an enlarged head 2 with its periphery fluted or ribbed to provide a multiplicity of fine ribs 3, which latter are adapted to slide into a complemental groove formation 4 in the side wall of a socket 5 for keying the windshield cleaner arm to the shaft. This socket is formed in the inner or mounting section 6 of the wiper arm, such mounting section being preferably die cast and shaped with a radial extension 7 having a chamber or channel 8 opening into the socket through a slot 9 in the side wall of the socket.

A friction latch 10 is movable back and forth in the slot 9 for frictionally engaging the ribbed periphery of the head 2. This friction latch is depicted herein in the form of a spring wire having a spring pressed shoe or active portion 11 terminating at its free end in a retainer part 12 which latter is adapted to engage behind a shoulder 13 to restrict the outward movement of the shoe into the socket. The spring pressed friction latch is mounted on a transverse pin 14 by coiling the spring wire thereabout as shown at 15 and thereafter the opposite extremity of the spring is extended tangentially and formed with an anchoring projection 18 which engages in a recess in the side wall of the extension 7 to correctly position the shoe.

This provides a practical lock-on device for the arm, the spring wire being, in effect, anchored at one end within the chamber 8 with the shoulder 13 functioning to limit the outward projection of the intermediately bowed active portion 11. The anchor is in the form of a spring coil which increases the spring urge for enhancing the binding engagement with the head 2. The wire shoe has more or less of a sliding fit in the slot 9 so as to give lateral support thereto, which support is extended to guide the free terminal part 12 also. Thus, should the wire-like shoe ride on the side or on the edge of one of the ribs 3 the side walls of the slot will confine the action of the shoe to a substantially radial plane and against much lateral play.

As the wiper arm is passed over the shaft head the spring latch will yield back into the slot 9 against the torsion of the spring coil 15 which latter serves to hold the shoe or active portion 11 bindingly against the shaft head so as to resist outward displacing movement of the arm from the head, except by the application of an abnormal pulling force thereto. This provides a practical means for enabling ready placement and displacement of the arm. If the wiper arm is not pushed onto the head to its fullest extent, the latch will nevertheless function to retain the arm against accidental displacement in any position subsequent to the initial contact of the shoe with the head. The mounting pin 14 may be in the form of a plain pin passed inwardly through registering holes in the opposite side walls of the channel where it will be retained by the overlapping ears 16 of the arm section 17 against accidental displacement. The arm section 17 is pivotally connected to the mounting section 6 by a pintle 22 and is urged by a spring 19 to press the wiper 20 against the windshield 21.

It will be understood that the foregoing disclosure is merely illustrative of the inventive principles involved, which may be applied to other physical embodiments without departing from the spirit and scope of the invention claimed.

What is claimed is:

1. A wiper arm having a socket for receiving a shaft part and formed with a channeled radial extension, the arm having an opening leading from the channel of the extension into the socket through its side wall, a transverse pin fixed in the channel, a latch arranged in the communicating opening and operating to frictionally engage such shaft part when in the socket, said spring having a mounting part coiled about the pin and an anchoring extremity engageable with a part on the extension to hold the latch operative.

2. A wiper arm having a shaft receiving socket and an adjacent chamber with a connecting slot of relatively narrow dimension, a retaining shoulder on the arm adjacent the slot, and a spring wire anchored at one end in the chamber and having its free end engaged behind the retaining shoulder, the intermediate portion of the wire being displaced outwardly through the slot into the socket to form a friction shoe engageable with such shaft when inserted in the socket.

3. A wiper arm having a shaft receiving socket and an adjacent chamber with a connecting slot of relatively narrow dimension, a retaining shoulder on the arm adjacent the slot, and a spring wire anchored at one end in the chamber and having its free end engaged behind the retaining shoulder, the intermediate portion of the wire being displaced outwardly through the slot into the socket to form a friction shoe engageable with such shaft when inserted in the socket, said spring anchor being in the form of an integrally connected spring coil.

4. A wiper arm having a shaft receiving socket and an adjacent chamber with a connecting slot of relatively narrow dimension, a retaining shoulder on the arm adjacent the slot, and a spring wire anchored at one end in the chamber and having its free end engaged behind the retaining shoulder, the intermediate portion of the wire being displaced outwardly through the slot into the socket to form a friction shoe engageable with such shaft when inserted in the socket, said spring anchor being in the form of an integrally connected spring coil with the opposite end of the coil being fixed.

5. A wiper arm having a shaft receiving socket and an adjacent chamber with a connecting slot of relatively narrow dimension, a retaining shoulder on the arm adjacent the slot, a spring wire anchored at one end in the chamber and having its free end engaged behind the retaining shoulder, the intermediate portion of the wire being displaced outwardly through the slot into the socket to form a friction shoe engageable with such shaft when inserted in the socket, said spring anchor being in the form of an integrally connected spring coil with the opposite end of the coil being fixed, and a fixed pin mounting the coil.

6. A wiper arm having a mounting section formed with a shaft receiving socket and a radial extension, the latter having a chamber and said section having a slot establishing communication between the chamber and the socket, the opposite sides of the chamber having opposed openings, a pin loosely disposed in the opposed openings and extending across the chamber, a wiper carrying section having spaced ears straddling the extension and overlying the openings to retain the pin in place, means pivotally connecting the ears to the extension, and a spring device mounted on the pin and yieldably pressing through the slot to engage a shaft when in the socket.

7. A wiper arm having a shaft receiving socket formed with a slot in its side wall, and a spring wire anchored at one end and having its opposite end extending toward the inner end of the socket and free for yielding movement in the slot, the intermediate portion of the wire being displaced outwardly from the slot into the socket to form a friction shoe engageable with such shaft when in the socket.

ANTHONY C. SCINTA.